April 18, 1933.  G. W. PERKS  1,904,925
FRYING PAN
Filed Sept. 10, 1931  2 Sheets-Sheet 1

INVENTOR
GEORGE W. PERKS
BY Ely Barrow
ATTORNEYS.

April 18, 1933. G. W. PERKS 1,904,925
FRYING PAN
Filed Sept. 10, 1931 2 Sheets-Sheet 2

INVENTOR
GEORGE W. PERKS
BY Ely Barrow
ATTORNEYS.

Patented Apr. 18, 1933

1,904,925

UNITED STATES PATENT OFFICE

GEORGE W. PERKS, OF AKRON, OHIO, ASSIGNOR OF ONE-HALF TO STANLEY H. AUSTIN, OF AKRON, OHIO

FRYING PAN

Application filed September 10, 1931. Serial No. 562,015.

This invention relates to griddles or frying pans.

The general purpose of the invention is to provide a griddle or frying pan with simple, easily adjustable means for supporting the same in a tilted position whereby grease will be drained from the frying foods so that they may be fried to a crisp, dry condition, the supporting means being adapted to be easily operated to an inoperative position, as, for example, to permit the grease to flow back over the frying surface without requiring manipulation of any hot parts.

The foregoing and other purposes of the invention are attained in the griddles or frying pans disclosed in the accompanying drawings and described below. It is to be understood that the invention is not limited to the specific form thereof shown and described.

Of the accompanying drawings.

Figure 3:
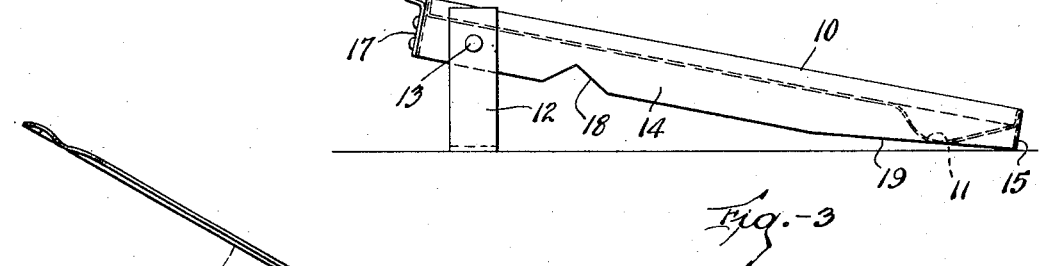
Figure 4:
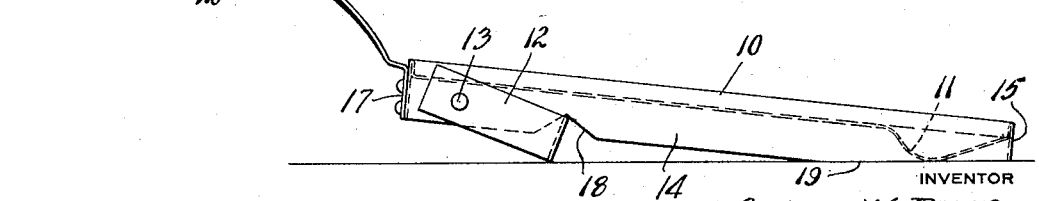
Figure 5:
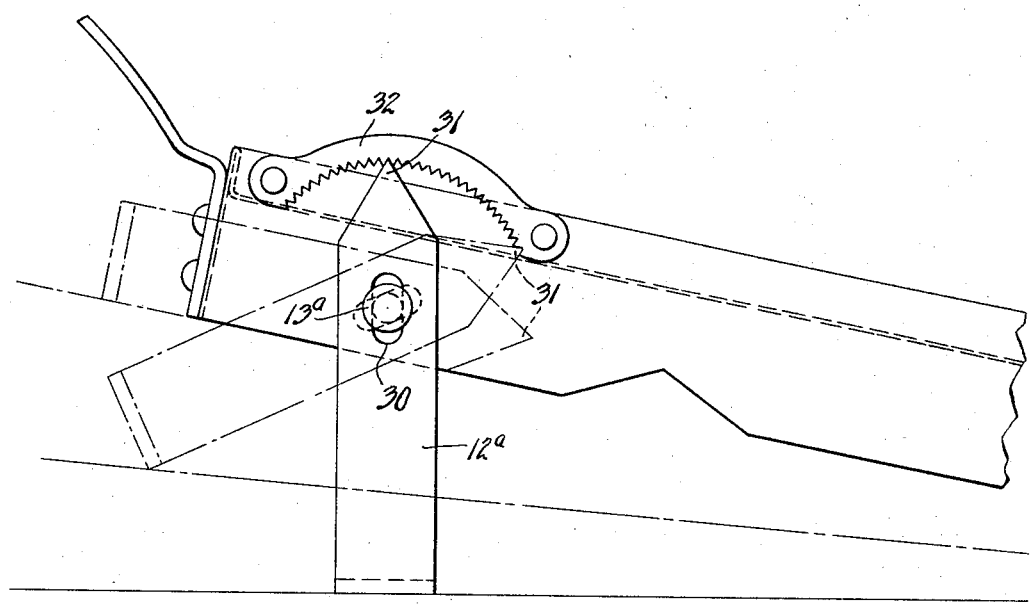
Figure 6:
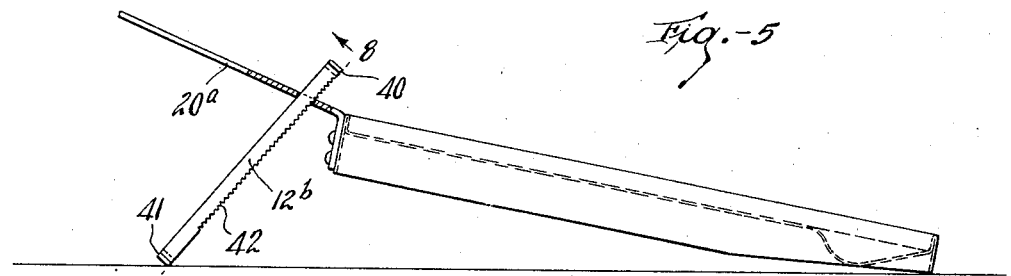
Figure 7:
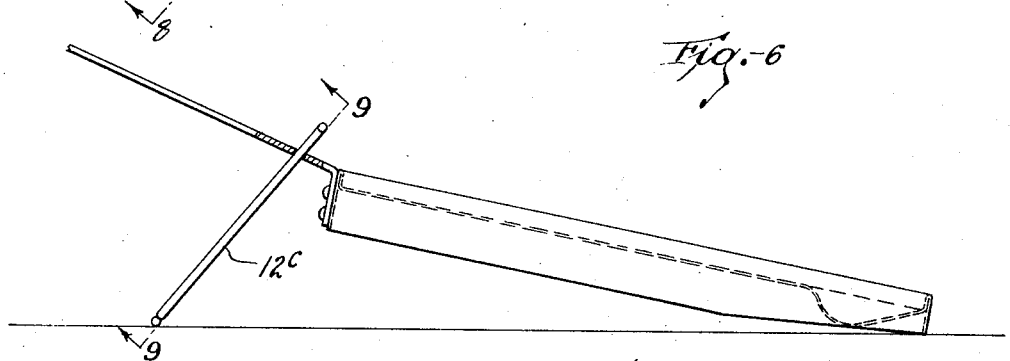

Figure 3 illustrated the griddle adjusted to a tilted grease-draining position;

Figure 4 is a view similar to Figure 3 showing the griddle in another tilted grease draining position;

Figure 5 is an enlarged elevation of a portion of another form of griddle or frying pan embodying the invention;

Figure 6 is a side elevation of a third form of the invention;

Figure 7 is a side elevation of a fourth form of the invention; and

Figure 8:
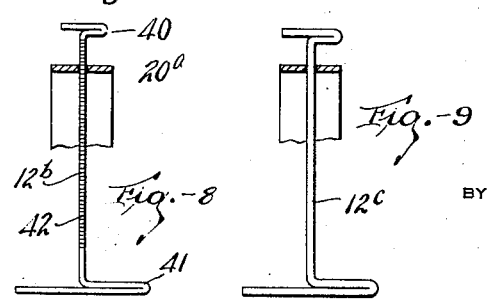
Figure 9:
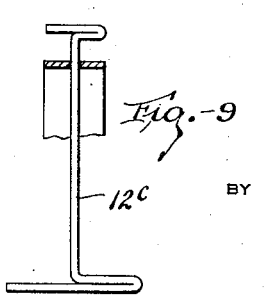

Figure 8 is a section on line 8—8 of Figure 6 and Figure 9 is a section on line 9—9 of Figure 7.

Figure 1:
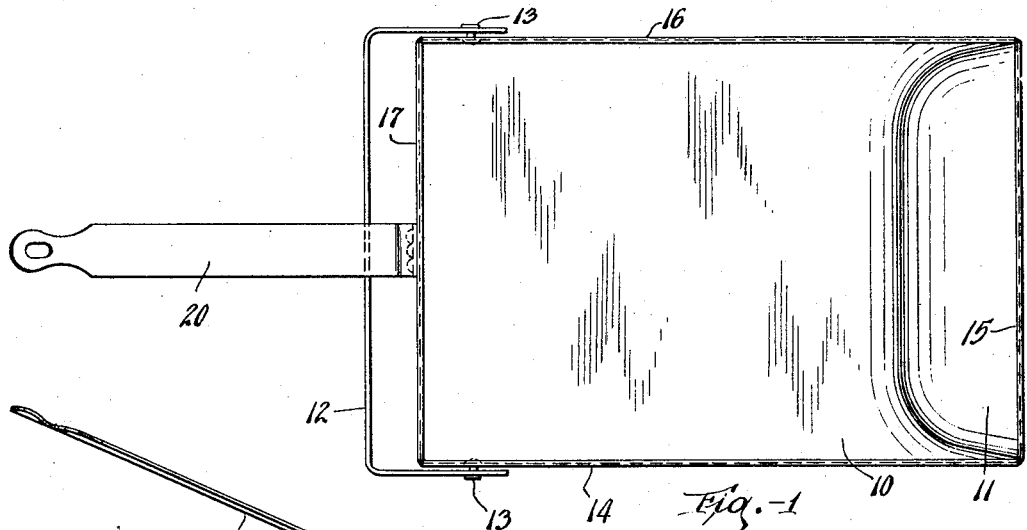
Figure 1 is a plan view of a griddle embodying the invention.
Figure 2:
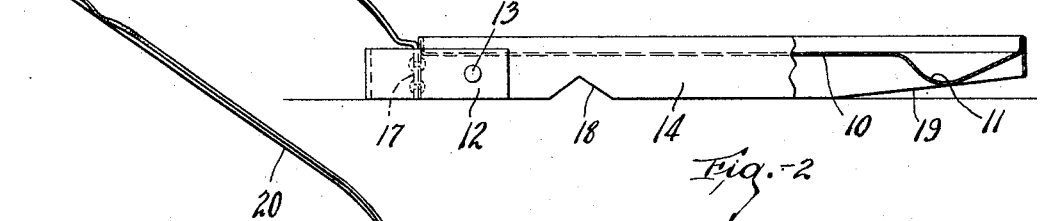
Figure 2 is a side elevation thereof.

Referring to Figures 1 to 4 of the drawings, the improved griddle or frying pan may comprise a suitable pan structure 10 provided with a depression 11 at one end to receive grease and with an adjustable supporting device 12 comprising a bail pivoted as at 13, 13 to the other end of the pan whereby the bail may lie in a flat condition extended beyond said end of the pan as in Figure 2 or swung to a vertical position for supporting the pan tilted as in Figure 3 or swung to a position under the pan to support the pan in a less tilted position as in Figure 4. The surface of the pan may be supported above the stove on which it is placed by flanges 14, 15, 16 and 17, and the flanges 14 and 16 may be notched as at 18, the notches receiving the bail 12 as in Figure 4. Flanges 14 and 16 may also be cut away as at 19 to facilitate supporting of the pan in an angular position.

The pan is provided with a handle 20 which may be secured to either end or to either side of the pan for handling the pan and for adjusting the pan to a horizontal position or either of its tilted positions.

In use the pan is adjusted to the position shown in Figure 3 from the position shown in Figure 2 by merely lifting the end of the pan to which the bail is pivoted, the bail swinging under the action of gravity to supporting position. From the position in Figure 3 the pan may be adjusted to the position in Figure 2 by simply grasping the handle and pushing the pan to the right, leaving the support in contact with the stove surface. From the position shown in Figure 3, the pan may be adjusted to the position in Figure 4 by merely pulling the pan to the left. The pan may be adjusted from the position in Figure 2 to the position in Figure 4 by lifting the bail end of the pan and pulling the pan to the left. The pan is adjusted from the position in Figure 4 to the position in Figure 3 by lifting the bail end of the pan and from the position in Figure 4 to the position in Figure 1 by lifting the bail end of the pan and pushing the pan to the right.

The form of the invention shown in Figure 5 is similar to that shown in Figures 1 to 4 with the exception that the bail 12ª is shiftable on its pivots 13ª as by being slotted as at 30 and has a pointed end 31 providing a pawl adapted to engage in a curved rack 32 fixed to the pan to hold the support 12ª at any desired position of adjustment between a substantially flat position beyond the end of the pan and a position under the pan whereby the pan may be held at substantially any angle between these limits. The weight of the pan shifts it on the adjusted support 20 that the pawl end 31 engages the rack 32 in any position to which the end of the pan is lifted and released. The support is readjusted by lifting the end of the pan to free the pawl from the rack and allowing the support or bail to remain in contact with the stove surface while moving the pan in the direction desired, whereby the bail will be swung to its readjusted position or back to its flat or horizontal position.

In the form of the invention shown in Figures 6 and 8, a support 12$^b$ may be extended through an aperture in the handle 20$^a$ so that it may rock slightly therein, the support having a head portion 40 and a foot portion 41 so designed as to prevent slipping of the support out of the aperture, the under side of the support being provided with a roughened or toothed formation 42 which may be omitted as shown in Figures 7 and 9 (see support 12$^c$).

In the forms of the invention shown in Figures 6 to 9, the pan is lifted at its support end to the desired height, the support shifting under the action of gravity with its foot portion resting on the stove surface, and the pan is then shifted to the right and released, causing the supports to rock in the apertures and causing the weight of the pan to lock it in its adjusted position on the support, which locking action is assisted by the toothed formation shown in Figures 6 and 8.

Modifications of the invention other than those referred to herein may be resorted to without departing from the spirit thereof or the scope of the appended claims.

What is claimed is:—

1. A frying pan having in combination a support pivoted so as to be freely shiftable thereon by lifting the pan and adapted to support the pan in a tilted position, said support being operable to a supporting position by lifting one side of the pan from a supporting surface, said pan being returnable to a horizontal position on said supporting surface by shifting the pan while maintaining contact of the support with said surface.

2. The combination with a frying pan of a support pivoted so as to swing freely upon one side thereof by lifting the pan so as to be operable between a horizontal position in the plane of the pan to an angular position under the pan to support the pan in a tilted position.

3. The combination with a pan of a support freely mounted on one side of the pan so as to be shiftable thereon by gravity upon lifting that side of the pan on which the support is mounted to support the pan in a tilted position, and means associated with the pan with which the support is adapted to engage by release of the pan to hold the support in supporting position.

4. The combination with a pan of a support shiftably mounted on one side of the pan whereby the support will move by gravity upon lifting that side of the pan on which the support is mounted to support the pan in a tilted position, means associated with the pan with which the support is adapted to engage by release of the pan to hold the support in supporting position, said support comprising a bail freely pivoted on the pan and movable relative to its pivots, and a rack on the pan, said bail having a pawl portion for engaging said rack, when said bail is moved relative to said pivots.

5. A frying pan having a handle and in combination therewith a support freely mounted so as to be shiftable longitudinally of itself through an aperture in the handle, said aperture being so proportioned that the support is released whereby upon lifting one side of the pan by the handle the support will shift through the aperture and by shifting the pan while the support is in contact with a supporting surface the support will be swung in the aperture to a position in which the support is gripped in the aperture to hold the pan in its tilted position under the action of the weight of the pan.

GEORGE W. PERKS.